(12) United States Patent
Alrabady et al.

(10) Patent No.: US 9,075,686 B2
(45) Date of Patent: Jul. 7, 2015

(54) SYSTEM AND METHOD TO IMPROVE CONTROL MODULE REFLASH TIME

(71) Applicant: GM GLOBAL TECHNOLOGY OPERATIONS LLC, Detroit, MI (US)

(72) Inventors: Ansaf I. Alrabady, Livonia, MI (US); Alan D. Wist, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 13/775,531

(22) Filed: Feb. 25, 2013

(65) Prior Publication Data

US 2014/0245284 A1    Aug. 28, 2014

(51) Int. Cl.
  *G06F 9/445*    (2006.01)
  *G06F 9/44*    (2006.01)
(52) U.S. Cl.
  CPC . *G06F 8/65* (2013.01); *G06F 8/665* (2013.01); *G06F 8/68* (2013.01)
(58) Field of Classification Search
  None
  See application file for complete search history.

(56) References Cited

U.S. PATENT DOCUMENTS

| | | | |
|---|---|---|---|
| 7,665,081 B1 * | 2/2010 | Pavlyushchik | 717/168 |
| 8,004,429 B2 | 8/2011 | Oh et al. | 341/50 |
| 8,463,758 B2 * | 6/2013 | Saner | 707/692 |
| 2008/0005733 A1 * | 1/2008 | Ramachandran et al. | 717/168 |
| 2008/0189695 A1 * | 8/2008 | Andersson et al. | 717/168 |
| 2011/0130892 A1 * | 6/2011 | Dulzo et al. | 701/2 |
| 2011/0145638 A1 * | 6/2011 | Syrgabekov et al. | 714/20 |
| 2011/0307879 A1 * | 12/2011 | Ishida et al. | 717/170 |
| 2012/0290530 A1 * | 11/2012 | Saner | 707/609 |
| 2013/0024850 A1 * | 1/2013 | Nutaro et al. | 717/169 |
| 2013/0031540 A1 * | 1/2013 | Throop et al. | 717/173 |
| 2013/0139149 A1 * | 5/2013 | Boulais et al. | 717/178 |
| 2014/0007074 A1 * | 1/2014 | Sporkert et al. | 717/172 |
| 2014/0245278 A1 * | 8/2014 | Zellen | 717/170 |

OTHER PUBLICATIONS

Idrees, M.S., et al., Secure Automotive On-Board Protocols: A Case of Over-the-Air Firmware Updates, Lecture Notes in Computer Science, vol. 6596, 2011, pp. 224-238, [retrieved on Mar. 9, 2015], Retrieved from the Internet: <URL:http://link.springer.com/chapter/10.1007%2F978-3-642-19786-4_20#>.*

Nilsson, D., et al., Creating a Secure Infrastructure for Wireless Diagnostics and Software Updates in Vehicles, Lecture Notes in Computer Science, vol. 5219, 2008, pp. 207-220, [retrieved on Mar. 9, 2015], Retrieved from the Internet: <URL:http://link.springer.com/chapter/10.1007/978-3-540-87698-4_19>.*

* cited by examiner

*Primary Examiner* — Thuy Dao
*Assistant Examiner* — Geoffrey St Leger (57) ABSTRACT

A control module reflash system includes a control module located in a vehicle that controls at least one function of the vehicle according to stored vehicle software. An external interface module receives a software file from a source external to the vehicle and receives a part number for the stored vehicle software in the control module. The external interface module retrieves a comparison software file from the source external to the vehicle corresponding to the part number and compares the software file and the comparison software file. The external interface module identifies differences between the software file and the comparison software file, generates a compressed file based on the differences, and provides the compressed file to the control module. The control module generates a flash file based on the received compressed file and the stored vehicle software and modifies the stored vehicle software based on the flash file.

14 Claims, 5 Drawing Sheets

SYSTEM AND METHOD TO IMPROVE CONTROL MODULE REFLASH TIME

FIELD

The present disclosure relates to software and calibration programming systems for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes various control modules including, but not limited to, an engine control module, a transmission control module, and a body control module. The control modules execute software to perform various respective functions. A programming tool is connected to vehicle systems to transfer software from the tool to the control modules. To upload new software from the tool to the control modules, the tool transfers the new software to the control module via a communications bus and a bootloader in the control module erases and writes the software/calibration data to permanent memory (e.g., flash).

The automobile industry is continually adding software features or making changes to current software code that must be uploaded to the control modules. With each additional software feature added, the software file becomes larger and takes longer to flash into the control modules. A large portion of the time (e.g., approximately 80%) that is spent flashing a vehicle includes transferring data files across a vehicle communication bus to the control modules. The remaining time (e.g., approximately 20%) is spent verifying the content of the new data, erasing the old data, and programming the new data into the control module's permanent memory.

SUMMARY

A control module reflash system includes a control module located in a vehicle that controls at least one function of the vehicle according to stored vehicle software. An external interface module receives a software file from a source external to the vehicle and receives a part number for the stored vehicle software in the control module. The external interface module retrieves a comparison software file from the source external to the vehicle corresponding to the part number and compares the software file and the comparison software file. The external interface module identifies differences between the software file and the comparison software file, generates a compressed file based on the differences, and provides the compressed file to the control module. The control module generates a flash file based on the received compressed file and the stored vehicle software and modifies the stored vehicle software based on the flash file.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A vehicle may include various modules including, but not limited to, an engine control module, a transmission control module, a hybrid control module, a fuel control module, and a body control module. Each of these modules contains software that controls various functions of the vehicle. The software may be uploaded to the modules from a computer. The computer is connected to the vehicle through an Assembly Line Diagnostics Link (ALDL), an Assembly Line Communications Link (ALCL), a wireless link, a remote reflash link, or any other suitable communications link. When the computer uploads the software to the vehicle, the software passes through a vehicle communication bus to the corresponding module. The vehicle communication bus may be one of a controller area network (CAN), a local interconnect network (LIN), media oriented systems transport (MOST) communication network, a FlexRay communication bus, and an Ethernet communication bus, or any other vehicle communication bus known in the art.

When the computer is connected to the ALDL and communicating with one of the modules, the computer can reprogram, or reflash, the software in the module. The reflash process rewrites the software in the module with new lines of code and values. With the addition of new features, the new calibration or corresponding software file size increases, accounting for an increase in the time it takes to reflash the vehicle. Generally, approximately 80% of the time reflashing a vehicle (a reflash time) is spent transferring data on the bus, and approximately 20% of the reflash time is spent verifying the content of the new data, erasing the old data, and programming the new data into the control module's permanent memory (i.e. flashing the module). A standard reflash process often takes approximately four minutes for one megabyte (MB) of data. A reflash process using the control module reflash system and method according to the present disclosure significantly reduces the reflash time. In other embodiments, the percentage of the reflash time transferring data across the communication bus may be less; however, with the system and method outlined in the present disclosure, this data transfer time will still be significantly reduced.

Figure 1:
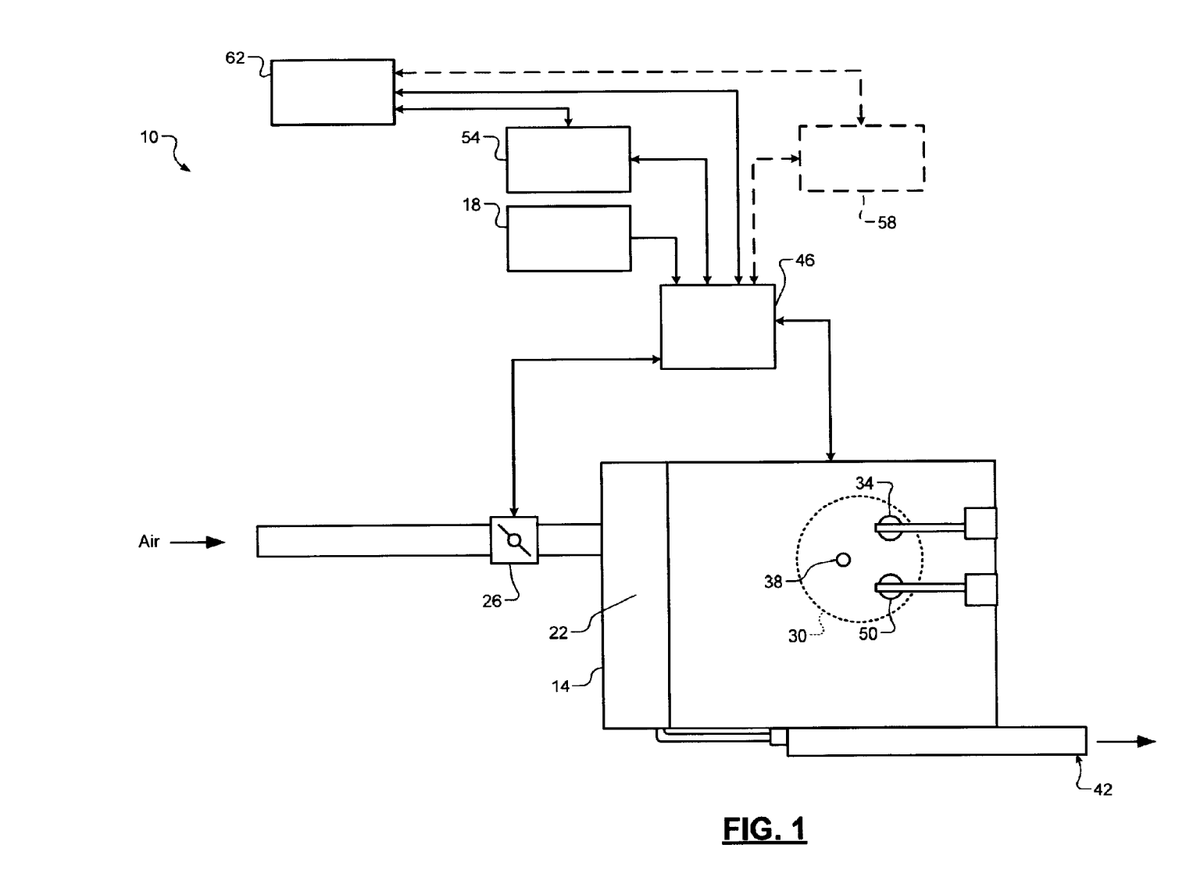
FIG. 1 is a schematic illustration of an engine system according to the present disclosure.

Referring now to FIG. 1, a functional block diagram of an example engine system 10 is illustrated. The engine system 10 includes an engine 14 that combusts an air/fuel mixture to produce drive torque for a vehicle based on driver input from a driver input module 18. Air may be drawn into an intake manifold 22 through a throttle valve 26. For example only, the throttle valve 26 may include a butterfly valve having a rotatable blade.

Air from the intake manifold 22 is drawn into cylinders of the engine 14. While the engine 14 may include more than one cylinder, for illustration purposes a single representative cylinder 30 is shown. The engine 14 may operate using a four stroke cycle. The four strokes may be named the intake stroke, the compression stroke, the combustion stroke, and the exhaust stroke. During each revolution of a crankshaft (not shown), two of the four strokes occur within the cylinder 30. Therefore, two crankshaft revolutions are necessary for the cylinder 30 to experience all four of the strokes.

In the intake stroke, air is drawn into the cylinder 30 through an intake valve 34. Fuel may be injected into the intake manifold 22 at a central location or at multiple locations. In various implementations (not shown), fuel may be injected directly into the cylinders or into mixing chambers associated with the cylinders.

The injected fuel mixes with air and creates an air/fuel mixture in the cylinder 30. During the compression stroke, a piston (not shown) within the cylinder 30 compresses the air/fuel mixture. The engine 14 may be a compression-ignition engine, in which case compression in the cylinder 30 ignites the air/fuel mixture. Alternatively, the engine 14 may be a spark-ignition engine, in which case a spark plug 38 energizes and ignites the air/fuel mixture. The timing of the spark may be specified relative to the time when the piston is at its topmost position, referred to as top dead center (TDC).

During the combustion stroke, the combustion of the air/fuel mixture drives the piston away from TDC, thereby driving the crankshaft. During the exhaust stroke, the piston begins moving up towards TDC and expels the byproducts of combustion through one or more exhaust valves. The byproducts of combustion are exhausted from the vehicle via an exhaust system 42.

An engine control module (ECM) 46 controls various engine hardware components such as intake and exhaust valves 34, 50, the throttle valve 26, and the spark plugs 38 to maximize engine operation according to the software in the control module 46. The opening and closing of the throttle valve 26 and the fuel injection (quantity and timing) into the cylinder 30 are regulated to achieve a desired air/fuel ratio. The spark timing for the cylinder 30 is controlled to achieve maximum power from the combustion. The exhaust valves 50 are controlled to release exhaust gas into the exhaust system at a defined time.

A transmission control module (TCM) 54 may communicate with the ECM 46 to determine various transmission functions or power output requirements from the engine 14. A hybrid control module (HCM) 58 may communicate with the ECM 46 to determine various commands or requirements from the engine 14.

An external interface module 62 and one or more of the control modules implements the control module reflash system. The external interface module 62 is located external to the vehicle and compiles a software and/or calibration file that is sent across the vehicle communication bus to the ECM, or various other control modules such as the TCM 54 or HCM 58, with the desired new software. The external interface module 62 may be part of an external computer, an external communication tool, or both. A bootloader (not shown) in the ECM, or other control module, may erase and write the software/calibration data to permanent history (e.g., flashes in the new software/calibration).

Figure 2:
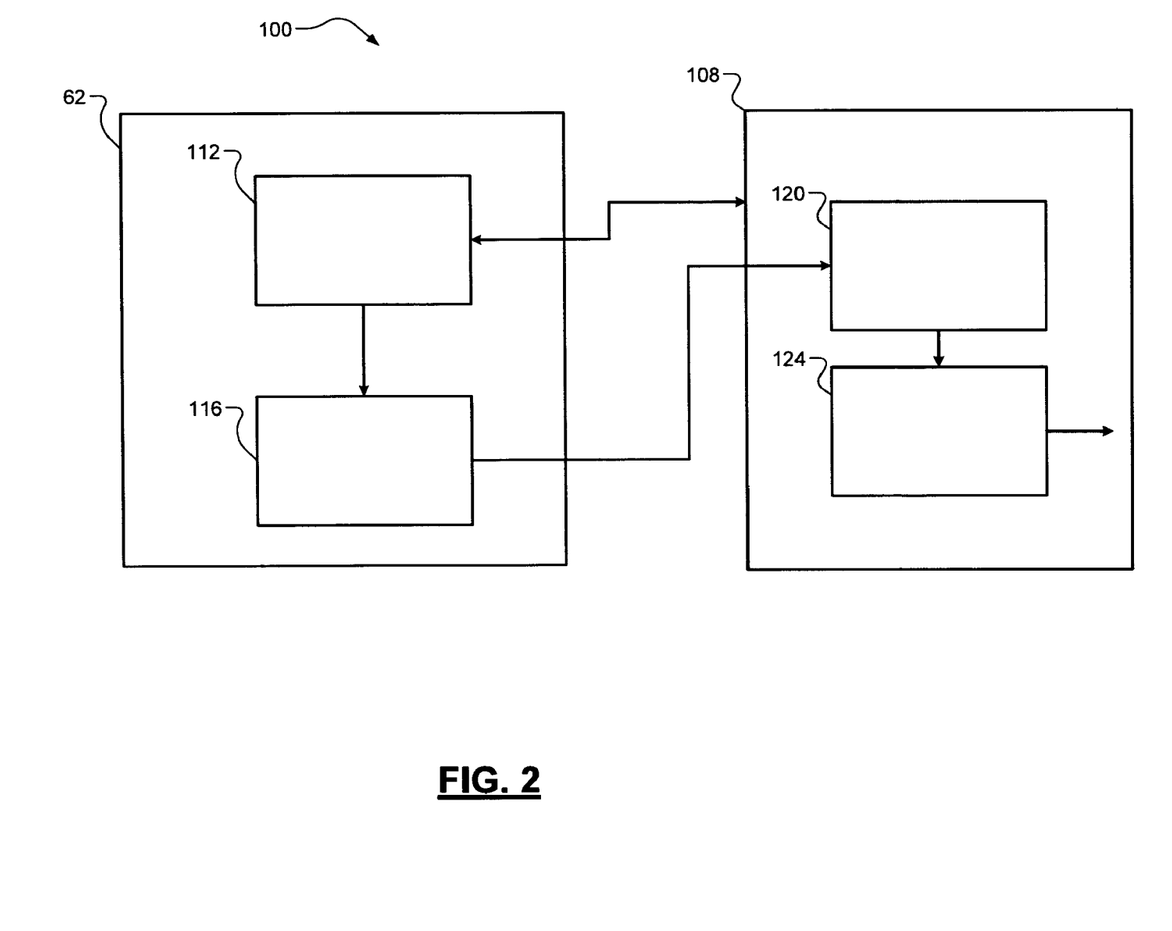
FIG. 2 is a functional block diagram of a control module reflash system according to the present disclosure.

Referring now to FIG. 2, a control module reflash system 100 includes the external interface module 62 and at least one control module 108 (e.g., the ECM 46, TCM 54, HCM 58, or any other control module in the vehicle). The external interface module 62 includes a comparison module 112 and a compilation module 116. The control module 108 includes a decompression module 120 and a flash module 124. The comparison module 112 communicates with the control module 108 and the external interface module 62. The comparison module 112 may be a portion of the interface module 62. For example, the comparison module 112 receives a new software or calibration file and determines the file type. The new software or calibration file may be stored in the external interface module 62, which may be an external computer or an external database. The comparison module 112 requests and receives a corresponding stored vehicle software or calibration part number from the control module 108. In another embodiment the comparison module 112 may have a predefined calibration part number and may not communicate with the control module 108. The comparison module 112 retrieves the comparison software or calibration file corresponding to the calibration part number from the external interface module 62. The comparison module 112 compares the bytes of code of the new software with the bytes of code in the comparison vehicle software. The comparison module 112 performs a bitwise comparison using exclusive-or logic (XOR) of the new software with the comparison software. For example, if the bits are identical, the comparison module 112 returns a "0". If the bits contain differences, the comparison module 112 returns a "1". The comparison module 112 generates an output image displaying the result of each compared bit of code.

For example only, if the new software file contains a calibration value of 0x01 in hexadecimal representation, the binary form of this value is 00000001. If the comparison software file contains a calibration value of 0x05 in hexadecimal representation, the binary form of this value is 00000101. The result of the bitwise XOR comparison is then 00000100.

The comparison module 112 communicates with the compilation module 116. For example, the comparison module 112 sends the output image of the bitwise XOR to the compilation module 116. The compilation module 116 creates a compressed file containing data in the output image generated by the comparison module 112. The output image may be compressed using a compression technique known in the art such as run length encoding.

Run length encoding compresses the output image by reducing the number of bytes of data in the file. Often, blocks of data will have a repeated sequence of bytes. Run length encoding reduces the number of bytes by returning a first byte of data expressing the length of the sequence and a second byte of data expressing the value of the sequence. For example only, run length encoding will compress a sequence of 100 bytes of "0x3F" to 2 bytes: first byte: 100 (length of sequence), second byte: 0x3F (value of sequence).

The compressed file contains data including both an indication of which bits in the software to replace (i.e., from the "1" and "0" indicators) and an identifier of a location of the bits in the software. The identifier may be an address associated with placement location of the line of code in the software or some other indicator. The compressed file may be a smaller size and contain less data than the new software or calibration file.

The compilation module 116 may store the compressed file in a location on the external interface module 62, may send the compressed file to be stored on a server (not shown), or may send the compressed file across the vehicle's communication bus to be written into one or several of the vehicle's control modules (for example only, TCM 54, ECM 46, or HCM 58).

The compilation module 116 communicates with the decompression module 120. For example, the compilation module 116 sends the compressed file to the decompression module 120 across the vehicle's communication bus. Since the compressed file is smaller, it is transferred across the communication bus much faster than the entire software or calibration file. The smaller compressed file reduces the first 80% of the reflash time.

In another embodiment, the compilation module 116 may communicate with a portion of the external interface module 62 that is a programming tool (not shown). The compilation module 116 may send the compressed file to the programming tool, and the programming tool (external interface module 62) may send the compressed file to the decompression module 120 across the vehicle's communication bus.

The decompression module 120 decompresses the compressed file creating a decompressed file. The decompression module performs a bitwise XOR on the decompressed file and a current vehicle software located in the control module (corresponding to the comparison vehicle software previously discussed) to generate a flash file. The resulting image from the bitwise XOR that is generated into the flash file is identical to the new software or calibration file.

For example only, if the new software file contains a series of bytes of 0x01 0x01 0x05 0x01 in hexadecimal representation, the binary forms of these values are 00000001 00000001 00000101 00000001. If the comparison software file contains calibration values of 0x05 0x01 0x05 0x01 in hexadecimal representation, the binary forms of these values are 00000101 00000001 00000101 00000001. The output image of the bitwise XOR comparison is then 00000100 00000000 00000000 00000000. The XOR output image is compressed to: first byte: 1, second byte: 0x04, third byte: 3, fourth byte: 0x00. The compressed file is sent across the vehicle communication bus to the decompression module 120. The decompression module decompresses the compressed XOR image file to 00000100 00000000 00000000 00000000. The decompression module then performs a bitwise XOR with the current vehicle software (00000101 00000001 00000101 00000001) to determine the changes. Since the first five (5) bits in the decompressed XOR image sequence are 0, the value of the bits in the flash file are identical to the current vehicle software (00000). Since the sixth bit in the decompressed XOR image is a 1, the sixth bit of the flash file changes from that of the current vehicle software (1) to 0. Since the last 26 bits in the decompressed XOR output image contain 0s, the value of the last 26 bits in the flash file are identical to those in the current software image. The resulting flash file is 00000001 00000001 00000101 00000001 which is the same as the new software file. Thus the flash file contains the series of bytes of 0x01 0x01 0x05 0x01.

If the decompression module 120 decompresses the compressed file and reads all "0s" for each byte, the decompression module 120 may determine that the new software or calibration file is identical to the current vehicle software or calibration. If the new software or calibration file is identical to the current vehicle software or calibration (i.e., the last software or calibration file that was programmed into the control module), the decompression module 120 may not create a flash file and, instead, may send a signal to the flash module 124 to stop the vehicle flash.

The decompression module 120 communicates with the flash module 124. For example, the decompression module 120 sends the flash file to the flash module 124. The flash module 124 rewrites, or reflashes, the data in the control module 108 with the data contained in the flash file.

The flash module 124 reflashes the current vehicle software or calibration by overwriting the data in the current vehicle software or calibration with the data in the flash file. The flash module 124 erases a portion of the flash memory on the control module 108. The flash module 124 reprograms the newly erased portion of the control module with the new software contained in the flash file.

If the flash module 124 receives the signal to stop the vehicle flash from the decompression module 120, the flash module 124 will end the vehicle flash, leaving the current vehicle software or calibration in the control module 108. By realizing that the control module 108 is already programmed with the desired software or calibration and stopping the vehicle flash, the control module reflash system 100 is decreasing the remaining 20% of the flash time.

Figure 3:
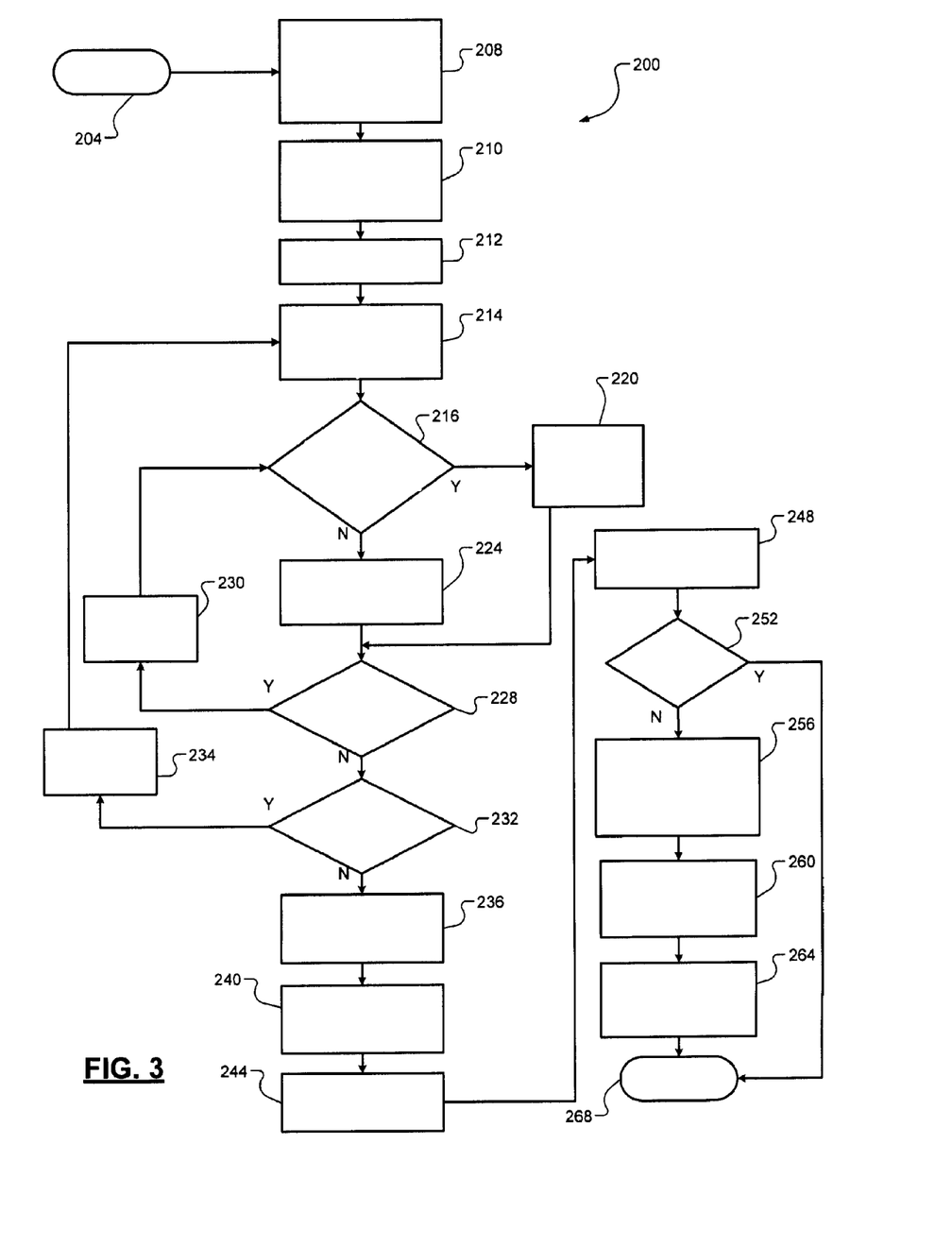
FIG. 3 is a flow diagram illustrating a control module reflash method according to the present disclosure.

Referring now to FIG. 3, a control module reflash method 200 begins at 204. At 208, method 200 receives a new software (or calibration) file and a current vehicle software (or calibration) part number. At 210, method 200 retrieves a comparison software file corresponding to the software part number. At 212-232, method 200 performs a bitwise comparison of the bytes of code of the new software file with the bytes of code in the comparison software file. At 212, method 200 translates the first byte of code to bits. At 214, method 200 compares the first bit of the new byte of code with the first bit of the comparison byte of code. At 216, method 200 determines whether the bit of the new byte of code is identical to the bit of the comparison byte of code. If true, method 200 returns a "0" at 220. If false at 216, method 200 returns a "1" at 224.

At 228, method 200 determines whether there are bits of code that have not been compared. If true, method 200 compares the next bit of code in the new byte with the next bit of code in the comparison byte at 230. Method 200 returns to 216 and determines whether the bit in the new byte of code is identical to the bit in the comparison byte of code. If false at 228, method 200 moves to 232.

At 232, method 200 determines whether there are bytes of code that have not been compared. If true, method 200 moves to 234 and translates the next byte of code to bits. Method 200 returns to 214 and compares the first bit of the new byte of code with the first bit of the comparison byte of code. If false at 232, method 200 moves to 236.

At 236, method 200 generates the output image containing "0" and "1" values. At 240, method 200 generates a compressed file from the output image. At 244, method 200 sends the compressed file to the control module. At 248, method 200 decompresses the compressed file. At 252, method 200 determines whether the decompressed file contains all "0s". If true, method 200 ends at 268. If false, method 200 continues to 256 and performs a bitwise comparison using exclusive-or logic (XOR) with the decompressed file and the current vehicle software to create a flash file.

At 260, method 200 erases the current calibration or software from the control module. At 264, method 200 writes the flash file to the control module. At 268, the control reflash method 200 ends file programming.

Figure 4:
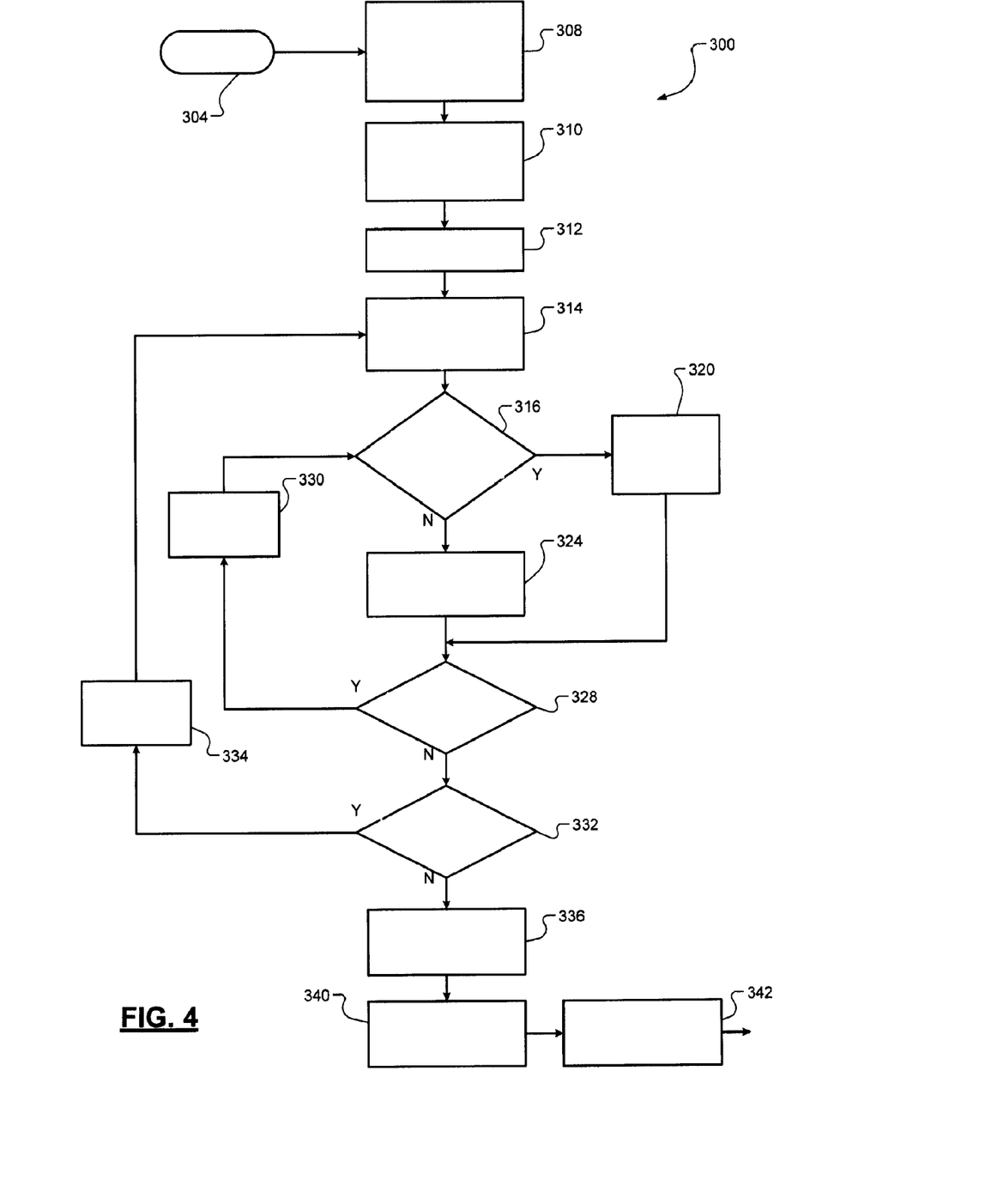
FIG. 4 is a flow diagram illustrating a first portion of a second embodiment of a control reflash method according to the present disclosure.
Figure 5:
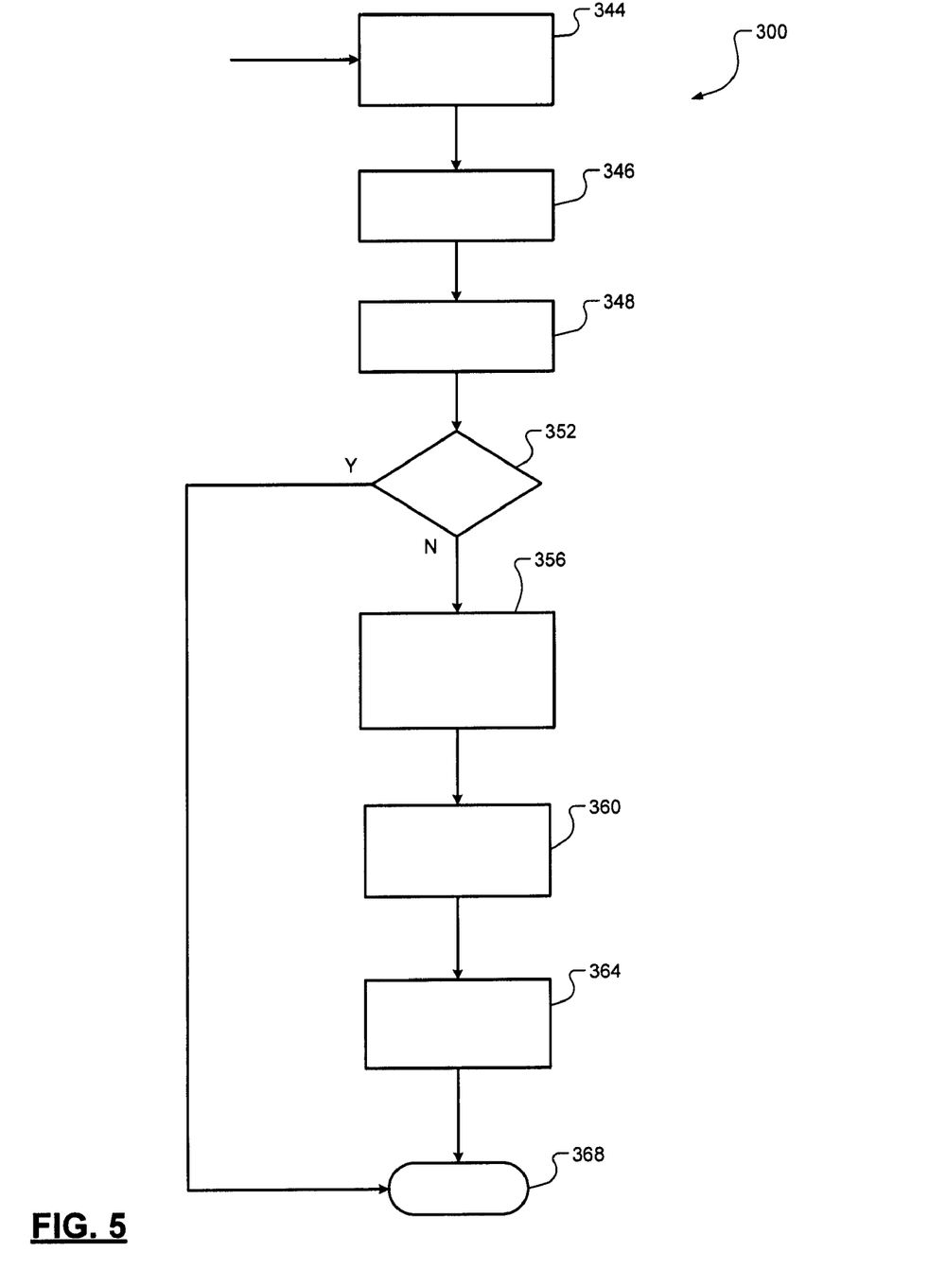
FIG. 5 is a flow diagram illustrating a second portion of the second embodiment of a control reflash method according to the present disclosure.

In a different embodiment illustrated in FIGS. 4 and 5, a control module reflash method 300 begins at 304. At 308, method 300 receives a new software (or calibration) file and a current vehicle software (or calibration) part number. At 310, method 300 retrieves a comparison software file corresponding to the software part number. At 312-332, method 300 performs a bitwise comparison of the bytes of code of the new software file with the bytes of code in the comparison software file. At 312, method 300 translates the first byte of code to bits. At 314, method 300 compares the first bit of the new byte of code with the first bit of the comparison byte of code. At 316, method 300 determines whether the bit of the new byte of code is identical to the bit of the comparison byte of code. If true, method 300 returns a "0" at 320. If false at 316, method 300 returns a "1" at 324.

At 328, method 300 determines whether there are bits of code that have not been compared. If true, method 300 compares the next bit of code in the new byte with the next bit of code in the comparison byte at 330. Method 300 returns to 316 and determines whether the bit in the new byte of code is identical to the bit in the comparison byte of code. If false at 328, method 300 moves to 332.

At 332, method 300 determines whether there are bytes of code that have not been compared. If true, method 300 moves to 334 and translates the next byte of code to bits. Method 300 returns to 314 and compares the first bit of the new byte of code with the first bit of the comparison byte of code. If false at 332, method 300 moves to 336.

At 336, method 300 generates the output image containing "0" and "1" values. At 340, method 300 generates a compressed file from the output image. At 342, method 300 stores the compressed file on a server and moves to FIG. 5.

At 344, method 300 retrieves the compressed file from the server. At 346, method 300 sends the compressed file to the control module. At 348, method 300 decompresses the compressed file. At 352, method 300 determines whether the decompressed file contains all "0s". If true, method 300 ends at 368. If false, method 300 continues to 356 and performs a bitwise comparison using XOR logic with the decompressed file and the current vehicle software to create a flash file.

At 360, method 300 erases the current calibration or software from the control module. At 364, method 300 writes the flash file to the control module. At 368, the control reflash method 300 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/ or rely on stored data. Non-limiting examples of the non-transitory tangible computer readable medium include nonvolatile memory, volatile memory, magnetic storage, and optical storage.

What is claimed is:

1. A system comprising:
    a first electronic circuit, located in a vehicle, configured to control at least one function of the vehicle according to stored vehicle software;
    a second electronic circuit configured to receive a software file from a source external to the vehicle and receive a part number for the stored vehicle software in the first electronic circuit, wherein the second electronic circuit is further configured to retrieve a comparison software file from the source external to the vehicle corresponding to the part number, compare the software file and the comparison software file, identify differences between the software file and the comparison software file, generate a compressed file based on the differences, and provide the compressed file to the first electronic circuit, wherein the first electronic circuit is configured to generate a flash file based on the compressed file and the stored vehicle software and modify the stored vehicle software based on the flash file;
    a third electronic circuit configured to identify the differences between the software file and the comparison software file by comparing a first byte of code in the software file with a corresponding first byte of code in the comparison software file, wherein the third electronic circuit is configured to return a first indicator if a first bit in the software file is the same as a first bit in the comparison software file and return a second indicator if the first bit in the software file is different than the first bit in the comparison software file; and
    a fourth electronic circuit configured to determine whether the compressed file contains only the first indicator, wherein;
    the first electronic circuit includes a fifth electronic circuit configured to overwrite the stored vehicle software using data contained in the flash file created by the fourth first electronic circuit from the compressed file and sent to the fifth electronic circuit from the fourth electronic circuit, and
    wherein the fourth electronic circuit is configured to send a "stop" signal to the fifth electronic circuit instead of sending the flash file to the fifth electronic circuit if the compressed file contains only the first indicator.

2. The system of claim 1, wherein the first electronic circuit does not copy the flash file into the first electronic circuit if the fourth electronic circuit sends the "stop" signal.

3. The system of claim 1, wherein the second electronic circuit is configured to send the compressed file over a vehicle communication bus to the first electronic circuit, and wherein the vehicle communication bus is one of a controller area network, a local interconnect network, a media oriented systems transport communication network, a FlexRay communication network, and an Ethernet communication network.

4. The system of claim 1, wherein the fourth electronic circuit is configured to decompress the compressed file and generate the flash file by performing a bitwise comparison using exclusive-or logic between the decompressed compressed file and the stored vehicle software.

5. The system of claim 1, wherein the fifth electronic circuit is configured to erase the stored vehicle software from the first electronic circuit and copy the flash file to the first electronic circuit.

6. The system of claim 1, wherein the software file is a calibration file.

7. The system of claim 1, wherein the second electronic circuit is configured to identify differences between the software file and the comparison software file by performing a bitwise comparison using exclusive-or logic between the software file and the comparison software file.

8. A computer-implemented method comprising:
   comparing lines of code in a software file provided by a source external to a vehicle and a comparison software file corresponding to a part number of a stored vehicle software located in a vehicle control module;
   identifying differences between the software file and the comparison software file by comparing a first byte of code in the software file with a corresponding first byte of code in the comparison software file;
   returning a first indicator if a first bit in the software file is the same as a first bit in the comparison software file and returning a second indicator if the first bit in the software file is different than the first bit in the comparison software file;
   generating a compressed file based on the differences;
   determining whether the compressed file contains only the first indicator;
   retaining the stored vehicle software if the compressed file contains only the first indicator;
   generating a flash file based on the compressed file and the stored vehicle software if the compressed file contains the second indicator; and
   modifying the stored vehicle software based on the flash file.

9. The method of claim 8, further comprising decompressing the compressed file to generate a decompressed file.

10. The method of claim 9, wherein the flash file is generated by performing a bitwise comparison using exclusive-or logic between the decompressed file and the stored vehicle software.

11. The method of claim 8, further comprising communicating the compressed file over a vehicle communication bus, wherein the vehicle communication bus is one of a controller area network, a local interconnect network, a media oriented systems transport communication network, a FlexRay communication network, and an Ethernet communication network.

12. The method of claim 8, further comprising erasing the stored vehicle software before copying the flash file.

13. The method of claim 8, further comprising identifying differences between the software file and the comparison software file by performing a bitwise comparison using exclusive-or logic between the software file and the comparison software file.

14. The method of claim 8, wherein the software file is a calibration file.

\* \* \* \* \*